United States Patent

Kato

[11] Patent Number: 5,663,515
[45] Date of Patent: Sep. 2, 1997

[54] ONLINE SYSTEM FOR DIRECT DRIVING OF REMOTE KARAOKE TERMINAL BY HOST STATION

[75] Inventor: Hirokazu Kato, Hamamatsu, Japan

[73] Assignee: Yamaha Corporation, Hamamatsu, Japan

[21] Appl. No.: 428,341

[22] Filed: Apr. 25, 1995

[30] Foreign Application Priority Data

May 2, 1994 [JP] Japan ..................... 6-115918

[51] Int. Cl.[6] .................... G09B 15/04; G10H 7/00
[52] U.S. Cl. ................ 84/609; 84/477 R; 434/307 A
[58] Field of Search ............... 84/601, 602, 609–614, 84/634–638, 477 R, 478; 369/33, 34; 370/60; 379/90, 93, 96; 463/31; 434/307 A

[56] References Cited

U.S. PATENT DOCUMENTS

| 5,127,303 | 7/1992 | Tsumura et al. ............... 84/609 |
| 5,157,643 | 10/1992 | Suzuki .......................... 369/33 |
| 5,194,683 | 3/1993 | Tsumura et al. ............. 84/609 X |
| 5,325,423 | 6/1994 | Lewis ........................... 379/90 |
| 5,353,337 | 10/1994 | Tsumura et al. ............... 379/93 |
| 5,357,505 | 10/1994 | Tsumura et al. ............... 370/60 |
| 5,437,464 | 8/1995 | Terasima et al. .............. 463/31 X |
| 5,454,723 | 10/1995 | Horii ......................... 84/477 R X |
| 5,463,605 | 10/1995 | Nishida et al. ............... 369/34 X |

*Primary Examiner*—Stanely J. Witkowski
*Attorney, Agent, or Firm*—Loeb & Loeb LLP

[57] ABSTRACT

A karaoke online system is composed of a karaoke station and a karaoke terminal telecommunicable with the karaoke station. The karaoke station has a database for storing a plurality of performance data files corresponding to a plurality of karaoke songs, each performance data file containing a sequence data which time-sequentially designates musical tones of the corresponding karaoke song. A selector responds to a request command transmitted from the karaoke terminal for selecting a performance data file of a karaoke song designated by the request command. A transmitter transmits the sequence data contained in the selected performance data file to the karaoke station in synchronization with a predetermined tempo of the designated karaoke song. On the other hand, the karaoke terminal transmits the request command to the karaoke station upon a request of the designated karaoke song to be performed. Further, a performing unit receives the sequence data transmitted from the transmitter and directly drives an internal tone generator in response to the received sequence data to thereby generate the musical tones of the designated karaoke song according to the predetermined tempo in real-time basis.

10 Claims, 4 Drawing Sheets

ONLINE SYSTEM FOR DIRECT DRIVING OF REMOTE KARAOKE TERMINAL BY HOST STATION

BACKGROUND OF THE INVENTION

The present invention relates to a karaoke online system comprised of a karaoke database and karaoke terminals. More specifically, the invention relates to a technology for transmitting a musical tone data of a requested song from the karaoke database to the karaoke terminal according to a given tempo of the requested song, while the karaoke terminal drives an internal tone generator according to the transmitted musical tone data to perform the requested karaoke song.

Referring to FIG. 4, a conventional karaoke online system includes a karaoke terminal 2 connected to a communication line 1. The karaoke terminal 2 has an internal bus 3 which connects altogether an RF demodulator 4, a central processing unit (CPU) 5, a buffer memory 6, a performance unit 7 provided with a musical instrument digital interface (MIDI) and so on. The memory 6 is controlled by the CPU 5 to receive a performance data of a requested karaoke song through the RF demodulator 4. The CPU 5 accesses the memory 6 to retrieve therefrom a musical tone data indicative of pitch and volume of musical tones, contained in the received performance data according to a given tempo of a requested song. The retrieved musical tone data is fed to the performance unit 7 to enable the same to drive an internal tone generator to thereby generate a musical tone signal. A sound system 9 receives the musical tone signal concurrently with a singing voice signal from a microphone (M) 8 to thereby perform the requested karaoke song. A player sings a melody part of the karaoke song along an orchestral accompaniment part thereof which is synthesized according to the performance data stored in the memory 6.

SUMMARY OF THE INVENTION

However, according to the prior art mentioned above, the performance data of one karaoke song is once reserved in the buffer memory 6 after the performance data is transmitted from the communication line 1. Accordingly, the conventional terminal requires a space for accommodating the buffer memory 6. Further, the karaoke terminal requires a controller or sequencer for controlling writing and reading of the buffer memory 6, which would limit a compact and simple design of the karaoke terminal 2. Thus, an object of the present invention is to provide a new karaoke online system which can simplify the construction of the karaoke terminal.

According to the invention, a system comprises a karaoke station and a karaoke terminal telecommunicable with the karaoke station. The karaoke station comprises database means for storing a plurality of performance data files corresponding to a plurality of karaoke songs, each performance data file containing a sequence data which time-sequentially designates musical tones of the corresponding karaoke song, selecting means responsive to a request command transmitted from the karaoke terminal for selecting a performance data file of a karaoke song designated by the request command, and first transmitter means for transmitting the sequence data contained in the selected performance data file to the karaoke terminal in synchronization with a predetermined tempo of the designated karaoke song. The karaoke terminal comprises second transmitter means for transmitting the request command to the karaoke station upon a request of the designated karaoke song to be performed, and performing means including a tone generator for receiving the sequence data transmitted from the first transmitter means, and for directly driving the tone generator in response to the received sequence data to thereby generate the musical tones of the designated karaoke song according to the predetermined tempo in real-time basis.

In operation of the inventive karaoke online system, upon request of a desired song by a player, the karaoke terminal transmits a request command to the karaoke station. In response, the karaoke station selects from the database a performance data file of the desired karaoke song designated by the request command. Then, the station reads out a sequence data contained in the selected performance data file, and time-sequentially transmits the sequence data to the karaoke terminal in a serial format timed by a predetermined tempo of the karaoke song. Then, the karaoke terminal directly drives the internal tone generator according to the transmitted sequence data to thereby perform the karaoke song in real time basis.

DETAILED DESCRIPTION OF THE INVENTION

Figure 1:
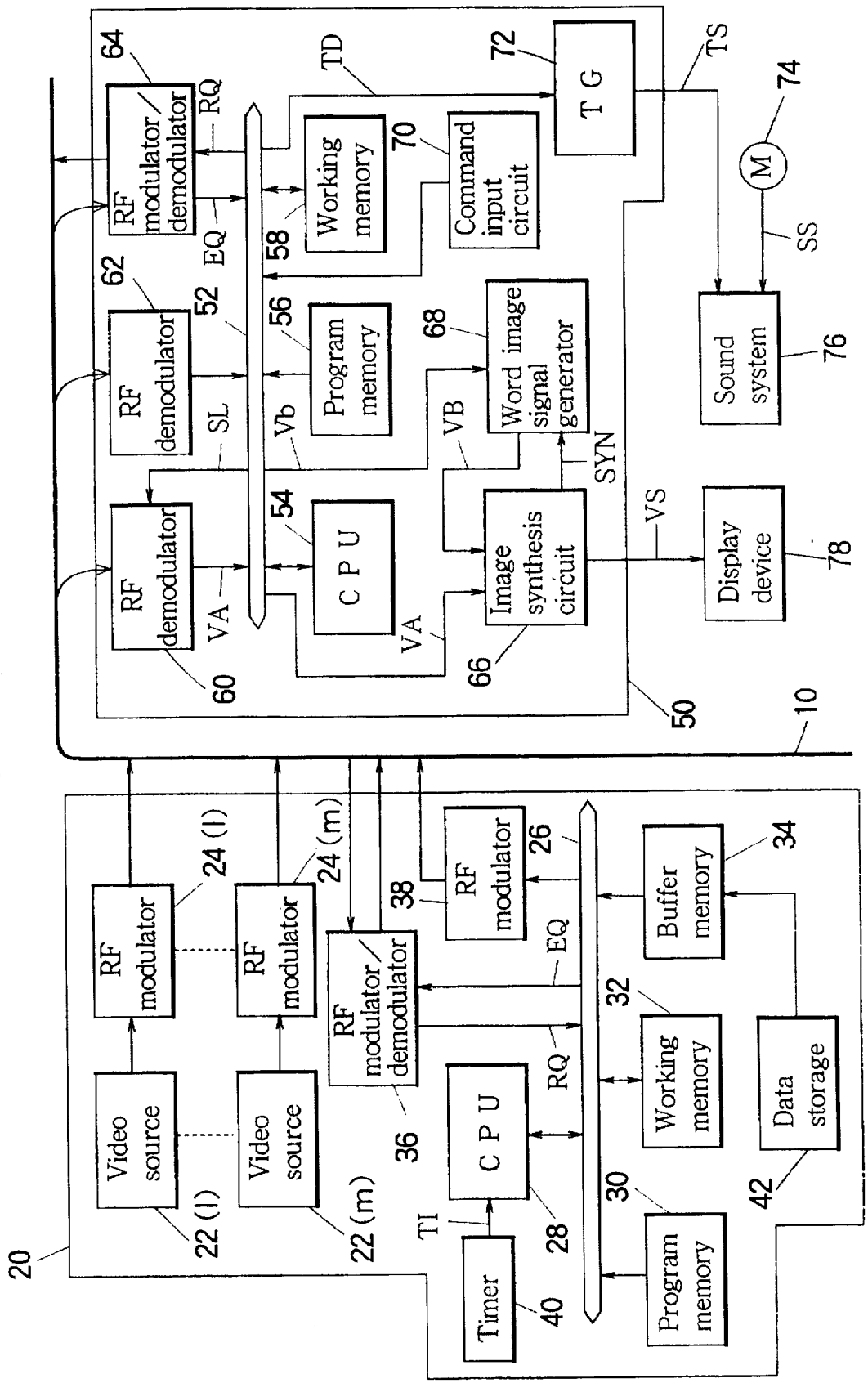
FIG. 1 is a block diagram showing one embodiment of the inventive karaoke online system.

Referring to FIG. 1, the inventive karaoke online system is constructed on a network of telecommunication lines 10 such as cable television (CATV) lines which interconnect a karaoke station 20 having a database, and a karaoke terminal 50 to each other. The karaoke terminal 50 may be installed in a local public facility called "karaoke box". The online system may involve a plurality of karaoke terminals, though only one terminal is shown in the figure for the simplicity.

The karaoke station 20 includes a plurality of video sources 22(1)–22(m), and a plurality of RF modulators 24(1)–24(m) corresponding to the respective video sources. Each modulator modulates a given carrier wave by a video data fed from the corresponding video source, and transmits the modulated carrier wave to the communication line 10. The respective modulators 24(1)–24(m) are assigned with different frequencies of the carrier wave to define separate video channels.

The video sources 22(1)–22(m) may be composed of an optical video disc player. For example, the first video source 22(1) may provide a background image data which matches popular songs, the second video source may provide another background image data which matches ballad songs, the third video source 22(3) may provide a still another background image data which matches folk songs, and so on. Then, the modulators 24(1)–24(m) continuously broadcast the modulated outputs corresponding to the respective background image data to the communication line 10 in parallel manner.

Further, the center or host station 20 has an internal bus line 26 which interconnects together a central processing unit (CPU) 28, a program memory 30, a working memory 32, a buffer memory 34, an RF modulator/demodulator (modem) 36, an RF modulator 38 and so on. The CPU 28 executes various processes or tasks such as communication controlling and memory addressing according to a program stored in the memory 30. The CPU 28 receives an interrupt signal TI from an internal timer 40 and counts the interrupt signal TI to measure a time interval which determines a reading timing of event data from the buffer memory 34. The working memory 32 is composed of a random access memory (RAM) which contains a memory area used as registers and counters when the CPU 28 executes the various tasks. The buffer memory 34 is also composed of RAM connected to a data storage 42. The data storage 42 is composed of CD-ROMs, each of which stores a bundle of performance data files in the order of a hundred or more so as to build up the database.

The modem 36 includes a modulative transmitter port which modulates a given carrier wave by an enquiry command EQ (call data) and transmits a modulated output to an addressed karaoke terminal through the telecommunication line 10. The modem 36 further includes a demodulative receiver port which receives a modulated output from the addressed karaoke terminal 50 through the communication line 10, and demodulates the modulated output to detect a request command RQ. The enquiry command EQ and the request command RQ are transferred through separate communication channels, which are different from the broadcast channels assigned to the video modulators 24(1)–24(m). The commands EQ and RQ are transferred by a certain bit rate in the order of, for example, 19.2 kbps. The CPU 28 transmits the enquiry command EQ or call message by means of the modem 36 to individual karaoke terminals in polling manner. The enquiry command EQ is an "invitation to send" transmitted from the control station to an individual tributary terminal. Then upon receipt of the request command RQ from the addressed karaoke terminal through the modem 36, the CPU 28 selects a performance data file of a karaoke song designated by the request command RQ from the storage 42, and loads the selected performance data file into the buffer memory 34. The modulator 38 modulates a carrier wave by the performance data stored in the memory 34, and transmits a modulated output in a serial data format timed according to a predetermined tempo of the designated karaoke song. The modulator 38 is assigned with an independent communication channel which is different from the channels of the video modulators 24(1)–24(m) and the modem 36. For example, the modulator 38 transmits the performance data at a bit rate of 10 Mbps.

Figure 2:
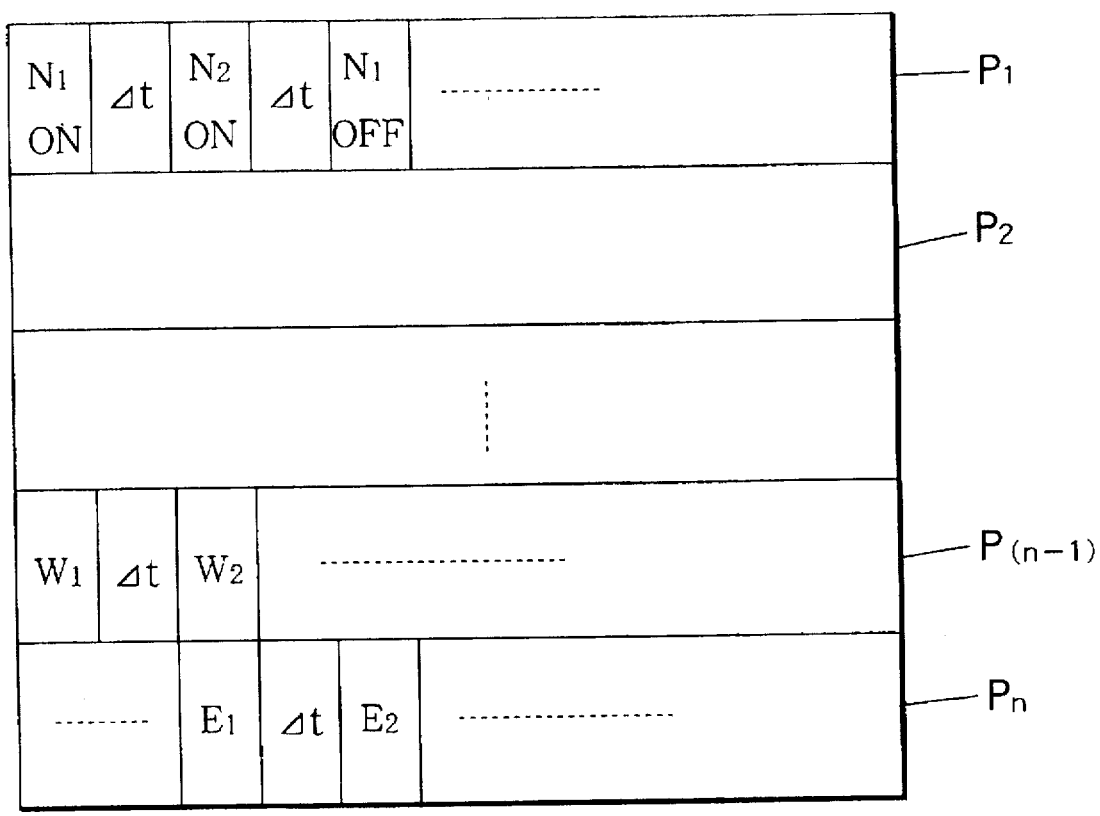
FIG. 2 is a schematic diagram showing a format of a karaoke performance data.

FIG. 2 shows a performance data format of one karaoke song. The exemplified data format is constructed based on Musical Instrument Digital Interface (MIDI) standard. The performance data file of the one karaoke song contains a plurality of parallel tracks or parts $P_1$–$P_n$ (for example, n=16). The first part $P_1$ may be a melody part, the second part $P_2$ may be an accompaniment part, the part $P_{(n-1)}$ may be a lyric word part, and the last part $P_n$ may be a control part.

The first part $P_1$ contains a musical tone sequence data composed of an alternate arrangement of an event data which is sequentially arranged in the order of occurrence, and a relative time interval data between adjacent events. The event data includes a first on-event data of note $N_1$, a second on-event data of note $N_2$, a third off-event data of note $N_1$ and so on. Each time interval data $\Delta t$ is interposed between adjacent event data to determine a time difference between preceding and succeeding events. The on-event data is comprised of an identification code and a musical tone data which designates a pitch and a volume of each musical tone. The off-event data has a modified form of the on-event data where the tone volume is set to zero.

The part $P_{(n-1)}$ contains a sequence of lyric word data. Each of word data $W_1$, $W_2$, ... indicates a phrase of the lyric in the form of a sequence of characters. The first word data $W_1$ represents an initial or top phrase of the song lyric, and the second word data $W_2$ represents another phrase subsequent to the top phrase. A time interval data $\Delta t$ is interposed between preceding and succeeding word data, so as to determine a time interval between corresponding preceding and succeeding lyric display events.

The last part $P_n$ is provided to control various effects or additional events such as PCM voice event, illumination event and microphone echo event. The last part $P_n$ contains a sequence of a first on-event data $E_1$, an interposed time interval data $\Delta t$, a second on-event data $E_2$ and so on. Though not shown in FIG. 2, the performance data file of each song contains a header data which prescribes a song identification code or song number, a designation of background image video (BGV) channel and so on.

In operation, the CPU 28 reads out an event data from each part, and then measures a lapse time by counting the interrupt signal TI. When the lapse time reaches the time interval determined by a time interval data $\Delta t$ next to the read event data, the CPU 28 reads out a next event data. By such a manner, the CPU 28 addresses the memory 34 to read out various event data from the respective parts or tracks, which include the note-on and note-off event data, the word data, the effect-on event data and so on.

Referring back to FIG. 1, the karaoke terminal 50 has an internal bus line 52 which connects altogether a CPU 54, a program memory 56, a working memory 58, an RF demodulator 60, another RF demodulator 62, an RF modem 64, an image synthesis circuit 66 such as a video superimposer, a word image signal generator 68, a command input circuit 70, a tone generator (TG) 72 and so on. The CPU 54 executes various tasks such as communication controlling and image displaying according to a program stored in the memory 56. The working memory 58 contains a memory area used as registers when the CPU 54 executes the various tasks. The command input circuit 70 is connected to an input implement such as a remote controller which is operated by a player or else to input a request command to designate a song number of a desired karaoke entry song to be performed by the player.

The modem 64 has a modulative transmitter port which modulates a given carrier wave by the inputted request command, and transmits a modulated output to the communication line 10. The modem 64 further has a demodulative receiver port which demodulates the modulated output transmitted from the counterpart modem 36 of the control station 20, so as to extract the enquiry command EQ or other messages. The demodulator 62 demodulates the modulated output transmitted from the counterpart modulator 38 to extract the performance data containing the musical tone sequence data, the lyric word sequence data, the effect event sequence data and so on. The other demodulator 60 selectively demodulates one of the modulated outputs broadcasted from the video modulators 24(1)–24(m) according to the BGV channel designation data contained in the received performance data, thereby extracting a BGV data which matches the requested karaoke song.

Figure 3A:
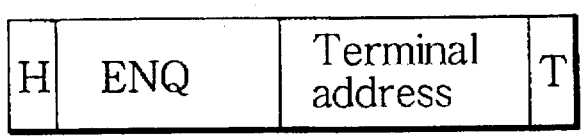
FIGS. 3A–3E show various data packets transferred in the inventive karaoke online system.
Figure 3B:
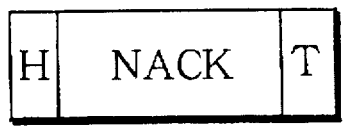
Figure 3C:
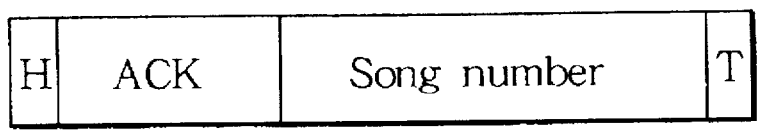
Figure 3D:
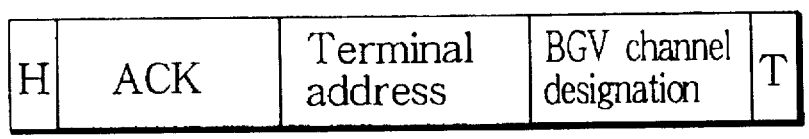
Figure 3E:
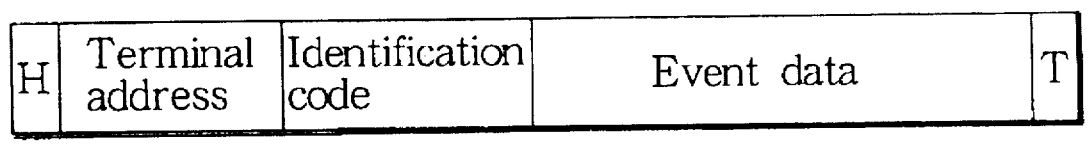
Figure 4:
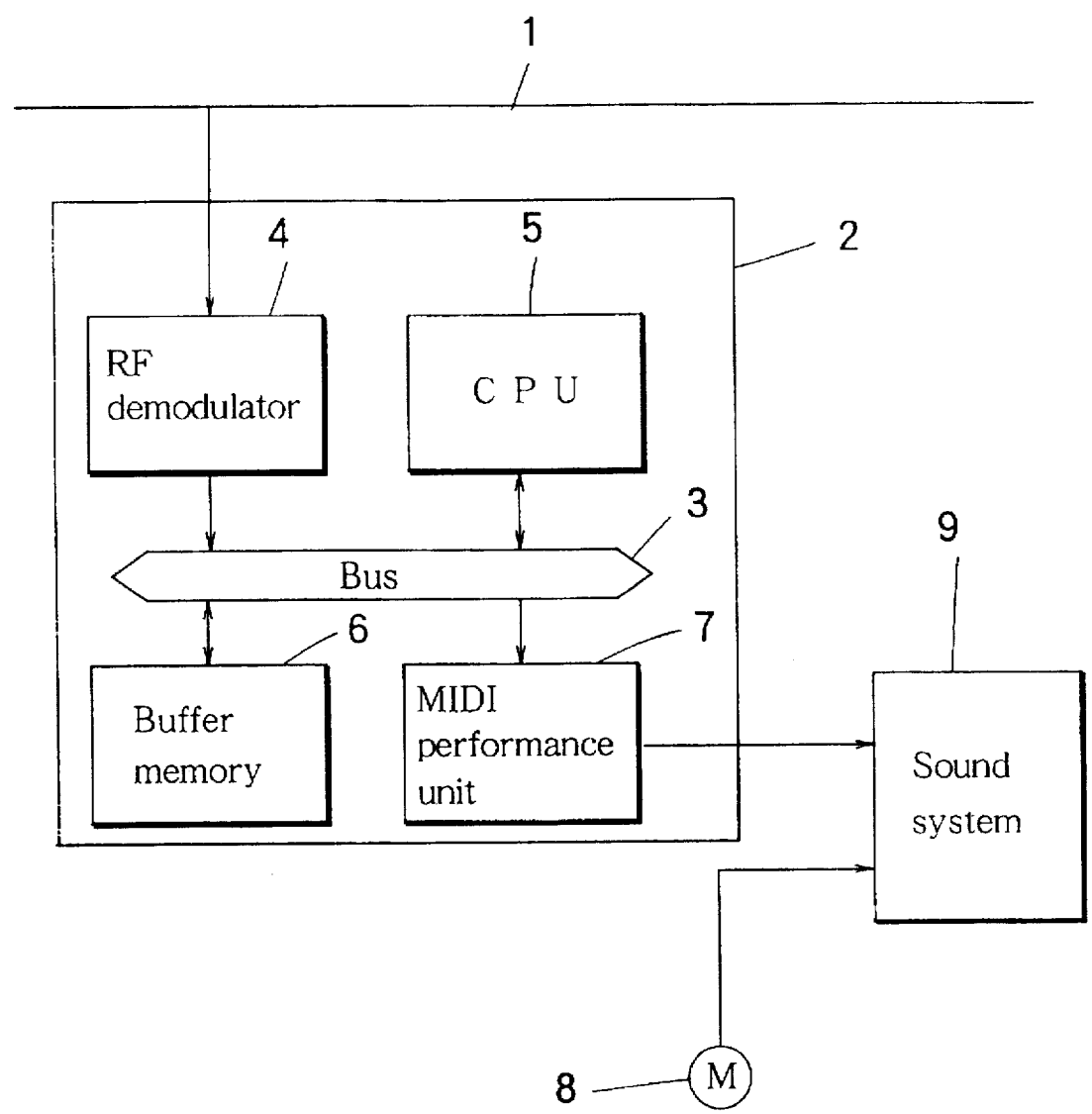
FIG. 4 is a block diagram showing a conventional karaoke online system.

FIGS. 3A–3E show various data packets transferred in the network system, where H denotes a header and T denotes a tailer. As shown in FIG. 3A, the CPU 28 successively transmits the enquiry command EQ containing an enquiry mark or message ENQ and a terminal address to the individual karaoke terminal, and waits therefrom a response. As shown in FIG. 3B, an idling karaoke terminal having no request command returns to the station a response command containing a negative mark or message NACK. On the other hand, as shown in FIG. 3C, another active karaoke terminal which admits a song request from a player returns to the station a request command RQ which contains an affirmative mark or acknowledgement message ACK and a requested song number. Further, as shown in FIG. 3D, the CPU 28 sends to the requesting karaoke terminal a confirmation command which contains the destined terminal address, an acknowledgement message ACK and a BGV channel designation. Thereafter, as shown in FIG. 3E, the CPU 28 time-sequentially transmits to the requesting terminal a packet of performance data which contains the destined terminal address, an identification code and an event data such as the musical tone data, the lyric word data and the effect data.

For example, upon an input of a number or code of the desired entry karaoke song through the command input circuit 70, the karaoke terminal 50 operates in response to the polling by the CPU 28 of the control station for transmitting thereto the request command RQ indicative of the requested song number through the combination of the modem 64 and the modem 36. The CPU 28 operates in response to the request command RQ to transfer the performance data file of the requested song from the storage 42 to the buffer memory 34. Subsequently, the CPU 28 transmits to the karaoke terminal 50 the BGV channel designation data contained in the performance data file stored in the memory 34. Thereafter, the CPU 28 transmits the event sequence data such as the musical tone data, lyric word data and the effect-on data stored in the memory 34 to the karaoke terminal 50 in time-sequential manner according to a predetermined tempo of the requested song, which may be timed by the internal timer 40.

The karaoke terminal 50 feeds the received musical tone data through the demodulator 62 to the tone generator 72 so as to directly drive the same in real time basis according to the sequence of the musical tone data without using an internal sequencer, thereby performing the requested karaoke song by the preset tempo which is not controlled by the terminal but remotely controlled by the station. The tone generator 72 has a multiple of tone generation channels, one of which is driven by the melody tone data to generate a melody tone signal of the melody part $P_1$ contained in the performance data file. The other tone generation channels are driven in similar manner to thereby produce an orchestral accompaniment of the karaoke song. Further, the musical tone signal starts damping in response to a note-off event data which designates a zero volume. A sound system 76 receives the musical tone signal TS and simultaneously receives a singing voice signal SS from a microphone (M) 74. The sound system 76 includes an amplifier and a loudspeaker for converting a mixture of the signals TS and SS into sounds. Accordingly, the player can enjoy a vocal performance of the karaoke song which is picked up by the microphone 74, along with the orchestral accompaniment.

Prior to the start of the karaoke performance, the CPU 28 retrieves the BGV channel designation information from the performance data file stored in the memory 34, and transmits the BGV channel designation information to the karaoke terminal 50 by means of the modem 36. The karaoke terminal 50 receives through the modem 64 the BGV channel designation information SL, which is then fed to the demodulator 60 as a control signal. Consequently, the demodulator 60 selectively retrieves a BGV signal VA from one of the broadcast channels designated by the information SL. The retrieved BGV signal VA is fed to the image synthesis circuit 66.

The image synthesis circuit 66 has a sync signal separating circuit which separates a sync signal SYN from the inputted BGV signal or background image signal (video signal) VA and which feeds the sync signal SYN to the word image signal generating circuit 68. The word image signal generating circuit 68 operates according to the lyric word data (character code data) from the demodulator 62 for forming a word image signal VB. The circuit 68 feeds the word image signal VB timed by the sync signal SYN to the image synthesis circuit 66. For example, the word image signal generating circuit 68 contains an image read-only memory (ROM) and a video RAM. The lyric word data is converted into an initial word image signal representative of a character pattern by means of the image ROM. The initial word image signal is once written into the video RAM, which is then addressed to read out the video signal VB of the word image. The word image signal VB is fed to the image synthesis circuit 66.

The image synthesis circuit 66 mixes the background image signal VA and the word image signal VB with each other to synthesize a composite image signal VS. The composite image signal VS is fed from the image synthesis circuit 66 to an image display device 78 such as CRT. Consequently, the display device 78 displays a mixture of the background picture and the lyric words superimposed to the background picture on a screen. Accordingly, the player can enjoy the vocal performance before the screen of the background picture superposed with the lyric word characters. In addition, the effect event data is distributed dependently on its kind to those of a voice decoder, a stage illumination equipment and a microphone echo controller.

In the above described embodiment, the BGV data is provisionally specified for each of the karaoke entry songs. In modification, the player may select a desired one of BGV scenes by means of the command input circuit 70. Otherwise, the BGV data may be supplied based on a request at the karaoke terminal. Moreover, a source of the BGV data may be installed in the karaoke terminal rather than the central station. However, the disclosed embodiment features simpler structure and process as compared to the various modifications.

As described above, according to the present invention, the karaoke database remotely feeds a sequence data of musical tones in synchronization with the tempo of the karaoke song to the karaoke terminal. Thus, the host station can directly drive the tone generator installed in the local terminal so that the local terminal does not need a buffer memory and a sequencer, thereby achieving a simple and compact design of the karaoke terminal. Stated otherwise, the buffer memory and the sequencer installed in the central station is commonly shared by a multiple of the local terminals.

What is claimed is:

1. A system comprising a karaoke station and a karaoke terminal communicable with the karaoke station:

the karaoke station comprising:

database means for storing a plurality of performance data files corresponding to a plurality of karaoke songs, wherein each performance data file contains a sequence data which time-sequentially designates musical tones of the corresponding karaoke song, selecting means responsive to a request command transmitted from the karaoke terminal for selecting a performance data file of a karaoke song designated by the request command, and first transmitter means for transmitting the sequence data contained in the selected performance data file to the karaoke terminal in synchronization with a predetermined tempo of the designated karaoke song; and the karaoke terminal comprising:
second transmitter means for transmitting the request command to the karaoke station upon a request of the designated karaoke song to be performed, and
performing means including a tone generator for receiving the sequence data transmitted from the first transmitter means, and for directly suppling and remotely driving the tone generator without buffering in response to the received sequence data to generate the musical tones of the designated karaoke song according to the predetermined tempo on a real-time basis.

2. A system according to claim 1, wherein the karaoke station further includes means for continuously broadcasting a plurality of background image signals representing a plurality of background scenes, and wherein the karaoke terminal includes means for selecting one of the broadcasted background image signals and for displaying a corresponding background scene which matches the designated karaoke song.

3. A system according to claim 2, wherein the karaoke station further includes means for transmitting a selection data effective to specify the background scene which matches the designated karaoke song, and wherein the karaoke terminal includes means for receiving the selection data so as to select the specified background scene.

4. A system according to claim 1, wherein the tone generator of the karaoke terminal directly receives the performance data from the karaoke station without processing through a memory buffer or a sequencer.

5. A system according to claim 1, wherein the karaoke station is connected to additional karaoke terminals, and wherein the karaoke station includes a common memory buffer that is used to drive the karaoke station and the additional karaoke stations without need of memory buffers in the karaoke terminal and the additional karaoke terminals.

6. A system according to claim 1, wherein the karaoke terminal is constructed without a memory buffer for storing the received performance data for use by the tone generator.

7. A method of directly supplying and remotely driving a tone generator contained in a karaoke terminal to perform a karaoke song by a karaoke station which has a database storing a plurality of performance data files corresponding to a plurality of karaoke songs, and which is communicably connected to the karaoke terminal, the method comprising the steps of:

transmitting a request command which designates a desired karaoke song from the karaoke terminal to the karaoke station;

selecting from the database a performance data file corresponding to the desired karaoke song designated by the request command;

transmitting back a sequence data of musical tones contained in the selected performance data file from the karaoke station to the karaoke terminal in time-sequential manner regulated by a predetermined tempo of the designated karaoke song; and directly supplying and remotely driving the tone generator without buffering at the karaoke terminal by the sequence data transmitted thereto to generate the musical tones to thereby perform the designated karaoke song.

8. A system comprising a karaoke station and at least one karaoke terminal communicable with the karaoke station:

the karaoke station comprising:
database means for storing a plurality of performance data files corresponding to a plurality of karaoke songs, wherein each performance data file contains a sequence data which time-sequentially designates musical tones of the corresponding karaoke song,
selecting means responsive to a request command transmitted from the karaoke terminal for selecting a performance data file of a karaoke song designated by the request command,
memory means to act as a common memory buffer for the at least one karaoke terminal; and
first transmitter means for transmitting the sequence data contained in the selected performance data file to the karaoke terminal in synchronization with a predetermined tempo of the designated karaoke song; and the at least one karaoke terminal comprising:
second transmitter means for transmitting the request command to the karaoke station upon a request of the designated karaoke song to be performed, and
performing means including a tone generator for receiving the sequence data transmitted from the first transmitter means, and for directly and remotely driving the tone generator in response to the received sequence data to generate the musical tones of the designated karaoke song according to the predetermined tempo on a real-time basis.

9. A system according to claim 8, wherein the karaoke station further includes means for continuously broadcasting a plurality of background image signals representing a plurality of background scenes, and wherein the karaoke terminal includes means for selecting one of the broadcasted background image signals and for displaying a corresponding background scene which matches the designated karaoke song.

10. A system according to claim 9, wherein the karaoke station further includes means for transmitting a selection data effective to specify the background scene which matches the designated karaoke song, and wherein the karaoke terminal includes means for receiving the selection data so as to select the specified background scene.

* * * * *